United States Patent
Fang (10) Patent No.: US 10,635,836 B2
(45) Date of Patent: *Apr. 28, 2020

(54) SYSTEMS AND METHODS FOR MANAGING AN ACCESS TO A NETWORK

(71) Applicant: Grace Fang, Inglewood, CA (US)

(72) Inventor: Grace Fang, Inglewood, CA (US)

(*) Notice: Subject to any disclaimer, the term of this patent is extended or adjusted under 35 U.S.C. 154(b) by 173 days.

This patent is subject to a terminal disclaimer.

(21) Appl. No.: 15/922,978

(22) Filed: Mar. 16, 2018

(65) Prior Publication Data

US 2019/0286851 A1  Sep. 19, 2019

(51) Int. Cl.
| | |
|---|---|
| G06F 21/62 | (2013.01) |
| G06Q 30/02 | (2012.01) |
| G06F 16/44 | (2019.01) |
| G06F 16/955 | (2019.01) |

(52) U.S. Cl.
CPC .......... *G06F 21/6263* (2013.01); *G06F 16/44* (2019.01); *G06F 16/9566* (2019.01); *G06Q 30/0277* (2013.01)

(58) Field of Classification Search
None
See application file for complete search history.

(56) References Cited

U.S. PATENT DOCUMENTS

| | | | | |
|---|---|---|---|---|
| 8,325,652 | B2* | 12/2012 | Aiba | H04W 24/10 370/252 |
| 9,747,354 | B2* | 8/2017 | Fang | G06F 16/958 |
| 2006/0221915 | A1* | 10/2006 | Gatta | H04W 84/18 370/338 |
| 2007/0019670 | A1* | 1/2007 | Falardeau | H04W 48/18 370/465 |
| 2013/0091239 | A1* | 4/2013 | Hao | H04L 29/06326 709/217 |
| 2015/0201424 | A1* | 7/2015 | Lin | H04B 11/00 370/329 |
| 2017/0060823 | A1* | 3/2017 | Zheng | G06F 16/248 |
| 2018/0070392 | A1* | 3/2018 | Shirai | H04W 40/02 |
| 2018/0317078 | A1* | 11/2018 | Qin | H04W 76/10 |
| 2018/0336728 | A1* | 11/2018 | Edwards | G01C 21/3626 |

* cited by examiner

*Primary Examiner* — Kaveh Abrishamkar
(74) *Attorney, Agent, or Firm* — KA Filing LLC; Wayne Harper (57) ABSTRACT

Methods and systems for providing an access of a network to a user are disclosed. A method includes receiving a selection of at least one Service Set Identifier (SSID) associated with the network from the user. The user may select the at least one SSID from a plurality of SSIDs on a computing device. The method further includes presenting an embedded multimedia along with a connect option on the computing device based on the selection of the at least one SSID. The method also includes connecting the computing device to the network based on a selection of the connect option. The method furthermore includes opening at least one webpage associated with at least one uniform resource locator (URL) related to the multimedia on the computing device.

20 Claims, 5 Drawing Sheets

SYSTEMS AND METHODS FOR MANAGING AN ACCESS TO A NETWORK

TECHNICAL FIELD

The presently disclosed subject matter generally relates to the Internet technologies. Particularly, the present subject matter relates to systems and methods for managing an access to a network, wherein the users accesses the network without providing personal information.

BACKGROUND

Millions of users connect to the Internet on daily basis for sharing, and gaining knowledge, for shopping, for entertainment, for business, and so forth. The Internet is a web of multiple network comprising wired and wireless networks. Each of the wired and wireless networks may further include a plurality of computing or electronic devices such as routers, modems, servers, gateways, client devices, and so forth. Communication technologies that can link multiple communication/electronic devices in a networked fashion are well known. Examples of communication networks may include, but are not limited to, wired packet data networks, wireless packet data networks, wired telephone networks, wireless telephone networks, and satellite communication networks, among other networks. These communication networks may enable client devices to communicate with each other on a global basis. Wired Local Area Networks (LANs), e.g., Ethernets are also quite common and support communications between networked computers and other devices within an area. The LANs may link serviced devices to Wide Area Networks and the Internet. Each of these networks is generally considered a "wired" network, even though some of these networks, e.g., the PSTN, may include some transmission paths that are serviced through wireless links/wireless networks.

Wireless networks such as, but not limited to, cellular telephone networks, wireless LANs (WLANs), and satellite communication networks are extensively used these days by millions of users all over the world on daily basis. Users like to be connected to the WLANs while on the go and almost always. Example of the WLANs may include, but are not limited to, IEEE 802.11(a) networks, IEEE 802.11(b) networks, and IEEE 802.11(g) networks, referred to jointly as "IEEE 802.11 networks." WLANs provide significant advantages when servicing portable devices such as portable computers, portable data terminals, mobile devices, and other devices that are not typically stationary.

Many service providers provide free access to wireless networks to users in places like, restaurants, airports, movie halls, auditoriums, offices, homes, and so forth. Some wireless networks are password protected and some may provide access for free but in exchange of user's personal information. The users cannot proceed exploring Internet without surrendering their personal information, which makes their personal information vulnerable. Therefore, the users have to surrender their personal identity information for accessing free wireless networks.

SUMMARY

In light of above discussion, there exists need for improved techniques for providing access of a network to a user without a need to surrender personal information. The present disclosure provides systems and methods for managing an access to a network, wherein the users need not require to surrender their personal information such as, but not limited to, name, e-mail, age, contact information, etc. for accessing the network.

The present disclosure provides systems and methods for providing access of a network to a user or a plurality of users by presenting a multimedia to the users. The multimedia may comprise at least one of an audio, a video, a text, and so forth.

The present disclosure provides systems and methods for connecting a computing device to a network after playing a multimedia comprising an advertisement of a product or a service. The user may not have to provide his/her personal information for accessing the network such as the Internet.

The present disclosure provides systems and methods for connecting a computing device to a network based on the playing of a multimedia on the computing device. A user may select at least one Service Set Identifier (SSID) from a plurality of Service Set Identifiers (SSIDs) for connecting to the network. The SSID may be an identifier or name of the network.

The present disclosure provides systems and methods for enabling a user to connect to a network based on an SSID of the network. The user may be provided access to the network comprising the Internet after playing one or more multimedia associated with the SSID.

An embodiment of the present disclosure provides a method for providing an access of a network to a user. The method includes receiving a selection of at least one Service Set Identifier (SSID) associated with a network from a user. The user may select the at least one SSID from a plurality of SSIDs on a computing device. The method further includes presenting an embedded multimedia along with a connect option on the computing device based on the selection of the at least one SSID. The method also includes connecting the computing device to the network based on a selection of the connect option. The method furthermore includes opening at least one webpage associated with at least one uniform resource locator (URL) related to the multimedia on the computing device.

Another embodiment of the present disclosure provides a system for providing an access of a network to a user. The system includes a transceiver configured to receive a selection of at least one Service Set Identifier (SSID) associated with the network from the user, wherein the user selects the at least one SSID from a plurality of SSIDs on an associated computing device. The system also includes a display-managing device configured to present an embedded multimedia along with a connect option on the computing device of the user based on the selection of the at least one SSID. The system further includes a connection-managing device configured to connect the computing device to the network based on a selection of the connect option. The display-managing device is further configured to open at least one webpage associated with at least one uniform resource locator (URL) related to the multimedia on the computing device.

Yet another embodiment of the present disclosure provides a freedom portal for managing an access to a network. The freedom portal includes a transceiver configured to receive a selection of at least one Service Set Identifier (SSID) associated with the network from a user. The user may select the at least one SSID from a plurality of SSIDs on an associated computing device. The freedom portal also includes a display-managing device configured to present an embedded multimedia along with a "Connect to Internet" option on the computing device of the user based on the selection of the at least one SSID, wherein the user may control playing of the embedded multimedia by selecting a play option. The display-managing device is also configured to present the one or more URLs related to the embedded multimedia to the user. The display-managing device is also configured to open at least one webpage associated with at least one URL based on a selection of the at least one URL of the one or more URLs by the user. The freedom portal further includes a connection-managing device configured to connect the computing device to the network based on a selection of the "Connect to Internet" option received from the user.

According to an aspect of the present disclosure, the display-managing device is further configured to provide a forward option for forwarding the multimedia and a rewind option for rewinding the multimedia to the user.

According to an aspect of the present disclosure, the display-managing device is further configured to provide the play option on the computing device for controlling playing of the embedded multimedia.

According to an aspect of the present disclosure, the connection-managing device is configured to connect the computing device to the network post completion of the embedded multimedia.

According to an aspect of the present disclosure, the user is allowed to terminate the playing of the embedded multimedia at any point of time.

According to an aspect of the present disclosure, the display-managing device is further configured to provide a play option for at least one of playing, pausing, forwarding and rewinding the multimedia on the computing device.

According to another aspect of the present disclosure, the display-managing device is further configured to automatically copy a URL related to the embedded multimedia to a clipboard of the computing device; automatically paste the URL in an address bar of a browser on the computing device; and open a webpage associated with the URL on the computing device.

According to another aspect of the present disclosure, the user pastes the URL in the address bar of the browser on the computing device.

According to another aspect of the present disclosure, the embedded multimedia comprising at least one advertisement.

According to another aspect of the present disclosure, the display-managing device is further configured to provide a forward option for forwarding the multimedia and a rewind option for rewinding the multimedia to the user.

According to another aspect of the present disclosure, the plurality of SSIDs are associated with the network.

The systems and methods disclosed in the present disclosure are widely applicable to the management of access to network data and media services.

Other and further aspects and features of the disclosure will be evident from reading the following detailed description of the embodiments, which are intended to illustrate, not limit, the present disclosure.

BRIEF DESCRIPTION OF THE DRAWINGS

The illustrated embodiments of the disclosed subject matter will be best understood by reference to the drawings, wherein like parts are designated by like numerals throughout. The following description is intended only by way of example, and simply illustrates certain selected embodiments of devices, systems, and processes that are consistent with the disclosed subject matter as claimed herein.

DETAILED DESCRIPTION

The following detailed description is made with reference to the figures. Exemplary embodiments are described to illustrate the disclosure, not to limit its scope, which is defined by the claims. Those of ordinary skill in the art will recognize a number of equivalent variations in the description that follows.

The functional units described in this specification have been labeled as devices. A device may be implemented in programmable hardware devices such as processors, digital signal processors, central processing units, field programmable gate arrays, programmable array logic, programmable logic devices, cloud processing systems, or the like. The devices may also be implemented in software for execution by various types of processors. An identified device may include executable code and may, for instance, comprise one or more physical or logical blocks of computer instructions, which may, for instance, be organized as an object, procedure, function, or other construct. Nevertheless, the executables of an identified device need not be physically located together, but may comprise disparate instructions stored in different locations which, when joined logically together, comprise the device and achieve the stated purpose of the device.

Indeed, an executable code of a device could be a single instruction, or many instructions, and may even be distributed over several different code segments, among different applications, and across several memory devices. Similarly, operational data may be identified and illustrated herein within the device, and may be embodied in any suitable form and organized within any suitable type of data structure. The operational data may be collected as a single data set, or may be distributed over different locations including over different storage devices, and may exist, at least partially, as electronic signals on a system or network.

Reference throughout this specification to "a select embodiment," "one embodiment," or "an embodiment" means that a particular feature, structure, or characteristic described in connection with the embodiment is included in at least one embodiment of the disclosed subject matter. Thus, appearances of the phrases "a select embodiment," "in one embodiment," or "in an embodiment" in various places throughout this specification are not necessarily referring to the same embodiment.

Furthermore, the described features, structures, or characteristics may be combined in any suitable manner in one or more embodiments. In the following description, numerous specific details are provided, to provide a thorough understanding of embodiments of the disclosed subject matter. One skilled in the relevant art will recognize, however, that the disclosed subject matter can be practiced without one or more of the specific details, or with other methods, components, materials, etc. In other instances, well-known structures, materials, or operations are not shown or described in detail to avoid obscuring aspects of the disclosed subject matter.

The freedom portal or system for managing or controlling an access to a network may be a software, hardware, firmware, or combination of these. In some embodiments, the freedom portal or the system for managing or controlling an access to the network may be present in a cloud network. The term "Freedom Portal" refers to a single device or a combination of multiple devices configured to enable a user to connect to a network by selecting an SSID without surrendering any personal information. The device or the system is further intended to include or otherwise cover all software or computer programs capable of performing the various heretofore-disclosed determinations, calculations, etc., for the disclosed purposes. For example, exemplary embodiments are intended to cover all software or computer programs capable of enabling processors to implement the disclosed processes. Exemplary embodiments are also intended to cover any and all currently known, related art or later developed non-transitory recording or storage mediums (such as a CD-ROM, DVD-ROM, hard drive, RAM, ROM, floppy disc, magnetic tape cassette, etc.) that record or store such software or computer programs. Exemplary embodiments are further intended to cover such software, computer programs, systems and/or processes provided through any other currently known, related art, or later developed medium (such as transitory mediums, carrier waves, etc.), usable for implementing the exemplary operations disclosed below.

In accordance with the exemplary embodiments, the disclosed computer programs can be executed in many exemplary ways, such as an application that is resident in the memory of a device or as a hosted application that is being executed on a server and communicating with the device application or browser via a number of standard protocols, such as TCP/IP, HTTP, XML, SOAP, REST, JSON and other sufficient protocols. The disclosed computer programs can be written in exemplary programming languages that execute from memory on the device or from a hosted server, such as BASIC, COBOL, C, C++, Java, Pascal, or scripting languages such as JavaScript, Python, Ruby, PHP, Perl or other sufficient programming languages.

Some of the disclosed embodiments include or otherwise involve data transfer over a network, such as communicating various inputs or files over the network. The network may include, for example, one or more of the Internet, Wide Area Networks (WANs), Local Area Networks (LANs), analog or digital wired and wireless telephone networks (e.g., a PSTN, Integrated Services Digital Network (ISDN), a cellular network, and Digital Subscriber Line (xDSL)), radio, television, cable, satellite, and/or any other delivery or tunneling mechanism for carrying data. The network may include multiple networks or sub networks, each of which may include, for example, a wired or wireless data pathway. The network may include a circuit-switched voice network, a packet-switched data network, or any other network able to carry electronic communications. For example, the network may include networks based on the Internet protocol (IP) or asynchronous transfer mode (ATM), and may support voice using, for example, VoIP, Voice-over-ATM, or other comparable protocols used for voice data communications. In one implementation, the network includes a cellular telephone network configured to enable exchange of text or SMS messages.

Examples of the network include, but are not limited to, a personal area network (PAN), a storage area network (SAN), a home area network (HAN), a campus area network (CAN), a local area network (LAN), a wide area network (WAN), a metropolitan area network (MAN), a virtual private network (VPN), an enterprise private network (EPN), Internet, a global area network (GAN), and so forth.

Figure 1:
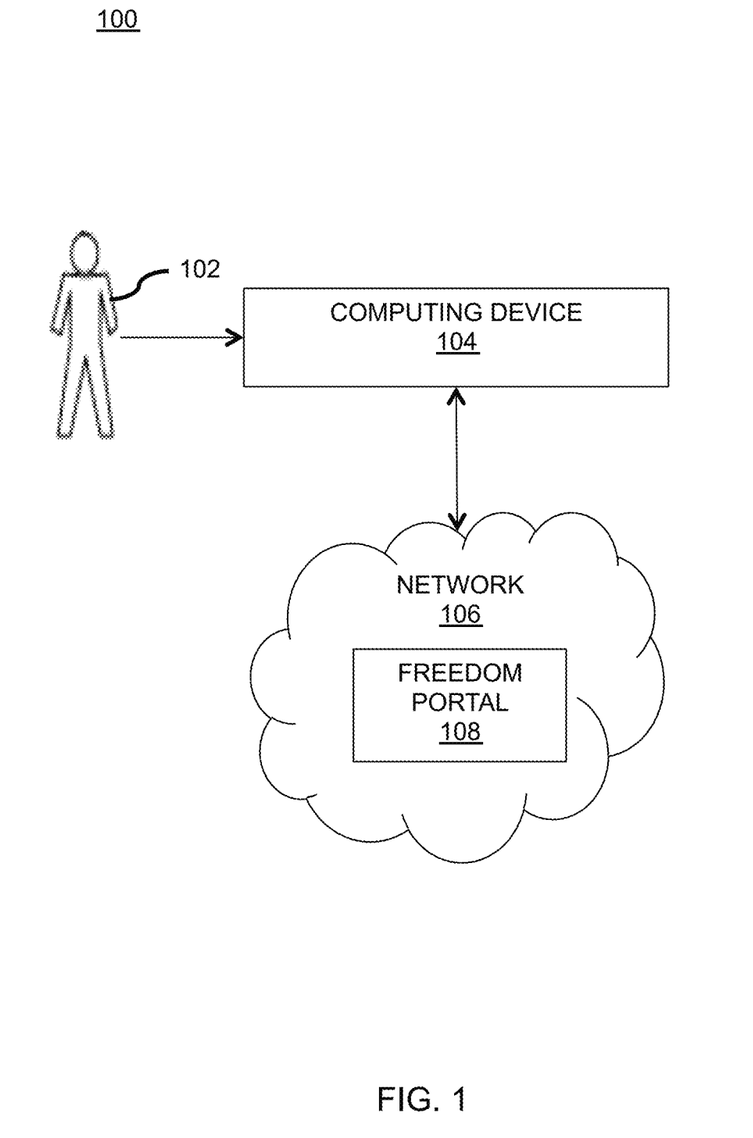
FIG. 1 is a schematic diagram illustrating an exemplary environment, where various embodiments of the present disclosure may function.

FIG. 1 is a schematic diagram illustrating an exemplary environment 100, where various embodiments of the present disclosure may function. As shown, the environment 100 primarily includes a user 102, a computing device 104 associated with the user 102, and a network 106 comprising a freedom portal 108. The user 102 may be any individual interested in accessing the network 106 or the Internet. The user 102 may select at least one Service Set Identifier (SSID) on the computing device 104. Examples of the computing device 104 may include, but are not limited to, a desktop computer, a laptop, a smart phone, a tablet computer, a television, and so forth. The computing device 104 may include a single device capable of communicating, and exchanging one or messages with other devices present in the network 106. The computing device 104 is also configured to connect to the network 106 such as the Internet.

The SSID may be a primary name associated with a wireless network including home networks and public hotspots. The client devices, such as the computing device 104, may use the SSID to identify and join wireless networks such as the network 106. In some embodiments, the SSID may be a case sensitive 32 alphanumeric identifier.

The network 106 may include the freedom portal 108. The freedom portal 108 may be a single device or combination of multiple devices comprising hardware, software, firmware, and so forth. In some embodiments, the freedom portal 108 may be located in a cloud network (not shown). The network 106 may be identified by an associated SSID. The user 102 can see a plurality of SSIDs of a plurality of networks that are available or in range of the computing device 104. The user 102 can select at least one of the plurality of SSIDs on the computing device 104. The freedom portal 108 may manage or control an access of the network 106. The freedom portal 108 may receive the selection of the at least one SSID from the computing device 104.

The freedom portal 108 may search for a multimedia corresponding to the selected at least one SSID and present on the computing device 104. The multimedia may be a pre-stored media at the freedom portal 108 or may be fetched in real-time from a third party server by the freedom portal. The multimedia may be selected based on one or more parameters, including but are not limited to, a location, the SSID. The multimedia may be played on the computing device 104 automatically. The user 102 may be provided with a play option to pause, forward, rewind or play the multimedia on the computing device 104. In some embodiments, the multimedia comprises an advertisement of a product or service. In some embodiments, the user 102 may forward or rewind the multimedia. The freedom portal 108 may present a "Connect to Internet" option along with the multimedia on the computing device. On completion of the multimedia, the user 102 may select the "Connect to Internet" option. Based on the selection of the "Connect to Internet" option, the freedom portal 108 may grant an access of the network 106 to the user 102.

In some embodiments, the freedom portal 108 presents a uniform resource locator (URL) or a webpage address related to the multimedia to the user 102 on the computing device 104. In other embodiments, the freedom portal 108 presents multiple URLs related to the multimedia and/or the at least one SSID to the user 102 on the computing device 104. The URL may a web address of a website related to the multimedia associated with the selected at least one SSID. In some embodiments, the freedom portal may present or display more than one URL related to the selected at least one SSID. Further, the URLs may be presented in multiple white boxes on the computing device 104. In some embodiments, the user 102 copies and pastes the URL or at least one preferred URL of the multiple URLs in a browsing application on the computing device 104 for accessing the website associated with the URL. In some embodiments, the freedom portal 108 provides access of the network 106 to the user 102 when the user 102 selects the "Connect to Internet" option after finishing of the multimedia on the computing device 104. In some embodiments, the computing device 104 is automatically connected to the network 106 as soon the multimedia finishes. In some embodiments, the user 102 may opt for not exploring the website linked to the URL related to the multimedia.

Further, in some embodiments, the freedom portal 108 may automatically copy the URL or at least one of the multiple URLs in a clipboard of the computing device 104 when the user 102 selects the "Connect to Internet" option. Further, the freedom portal 108 may automatically open the webpage linked to the URL or the at least one URL after connecting the computing device 104 of the user 102 to the Internet/network 106. Then, the user 102 may continue using or exploring the network 106 (i.e. the Internet). Therefore, the user 102 is given two-tier selection freedom, one for the selection of the SSID and one for the selection of the related URL in the white boxes. The user 102 can access the network without surrendering his/her personal information.

Figure 2:
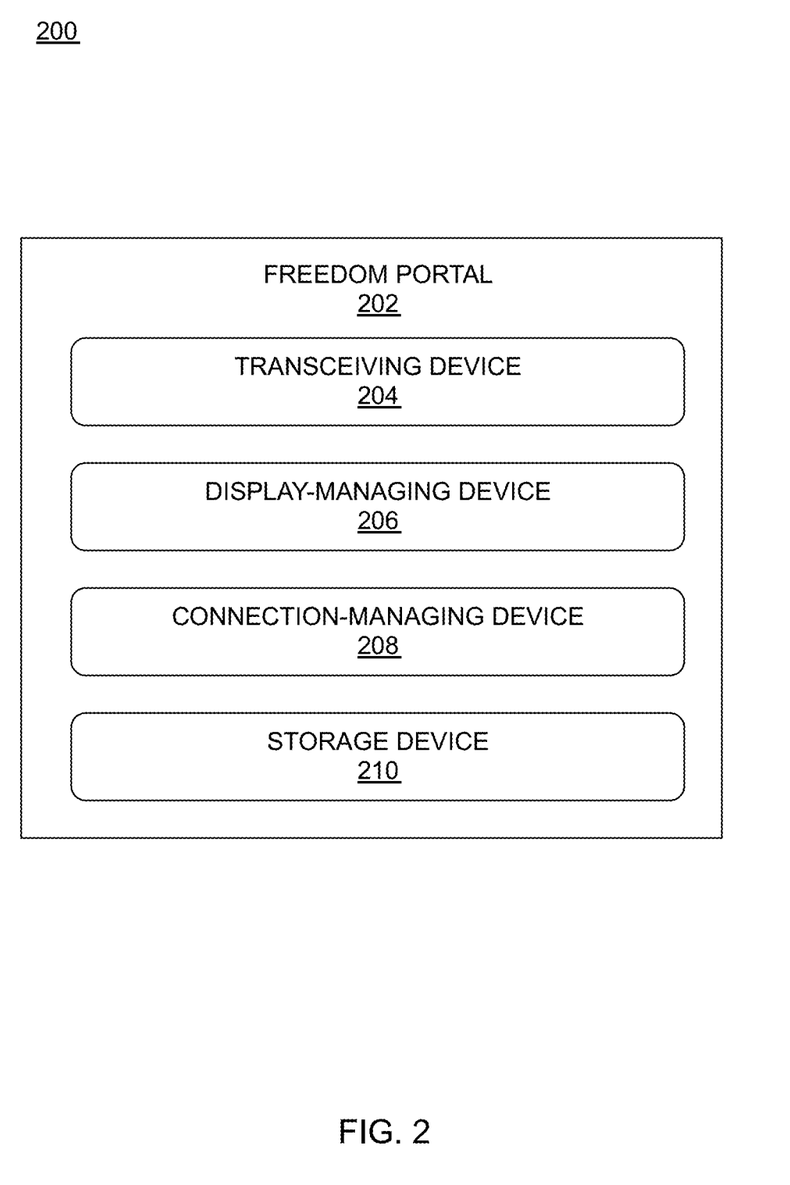
FIG. 2 is a block diagram illustrating various system elements of an exemplary freedom portal, in accordance with an embodiment of the present disclosure.

FIG. 2 is a block diagram 200 illustrating various system elements of an exemplary freedom portal 202, in accordance with an embodiment of the present disclosure. As shown, the freedom portal 202 may include a transceiver 204, a display-managing device 206, a connection-managing device 208, and a storage device 210. As discussed with reference to the FIG. 1, the user 102 may select at least one Service Set Identifier (SSID) from one or more SSIDs on the computing device 104 for connecting to the network 106. The transceiver 204 may be configured to receive a selection of the at least one Service Set Identifier (SSID) associated with a network, such as the network 106, from the user 102. The SSID may be a primary name associated with the network 106 comprising a wireless network. In some embodiments, the plurality of SSIDs is associated with the plurality of networks. The computing device 104 may use the SSID to identify and join wireless networks. In some embodiments, the SSID may be a case sensitive 32 alphanumeric identifier. The transceiver 204 may be a single device or a combination of multiple devices comprising at least one of a hardware, software, firmware, and combination of these. The freedom portal 202 may be a single device or a combination of multiple devices configured to enable the user 102 to connect to the network 106 by selecting an SSID and without a need of surrendering any of his/her personal information. The freedom portal enables a user to connect to the network 106 and also gives him/her the freedom to select the SSID and a related URL associated with a multimedia.

The display-managing device 206 may be configured to present an embedded multimedia along with a connect option on the computing device 104 of the user 102 based on the selection of the at least one SSID. The embedded multimedia may include at least one advertisement associated with the selected at least one SSID. The connect option may be a "Connect to Internet" option. The display-managing device 206 may be configured to provide a forward option for forwarding the multimedia and a rewind option for rewinding the multimedia to the user 102. In some embodiments, the display-managing device 206 may provide a play option for enabling the user 102 to forward, pause, rewind, and play the multimedia. In some embodiments, the user 102 is allowed to terminate the playing of the embedded multimedia at any point of time. Further, after terminating the user 102 may select the "Connect to Internet" option for connecting to the network 106.

The display-managing device 206 may also be configured to present the one or more URLs related with the embedded multimedia to the user 102 in multiple white boxes. The user 102 may select and copy/paste the URL (or a preferred URL from the one or more URLs) in the address bar of the browser on the computing device 104. In some embodiments, the display-managing device 206 may also be configured to open the at least one webpage associated with the at least one URL of the one or more URLs based on a selection of the at least one URL by the user 102.

In some embodiments, the display-managing device 206 is configured to automatically copy the one or more URLs related to the embedded multimedia in a clipboard of the computing device 104. The display-managing device 206 may also be configured to automatically paste the one or more URLs in an address bar of the browser or browsing application on the computing device 104. The display-managing device 206 may also be configured to open a webpage or website associated with the one or more URLs on the computing device 104. Examples of the browser or the browsing application may include, but are not limited to, Mozilla, Safari, Opera, Internet Explorer, Google Chrome, and so forth. The display-managing device 206 may include hardware, software, firmware, and combination of these.

The connection-managing device 208 may be configured to connect the computing device 104 to the network 106 based on a selection of the connect option by the user 102. The connection-managing device 208 may include hardware, software, firmware, and combination of these.

In some embodiments, the display-managing device 206 is further configured to provide the play option on the computing device 104 for controlling playing of the embedded multimedia.

In some embodiments, the connection-managing device 208 is configured to connect the computing device 104 to the network 106 after completion of the embedded multimedia.

The display-managing device 206 is further configured to open at least one webpage associated with at least one uniform resource locator (URL) related to the multimedia and/or SSID on the computing device 104.

The storage device 210 is configured to store identity information of the users, a plurality of networks, SSIDs, URLs, multimedia, location information, and so forth.

Figure 3:
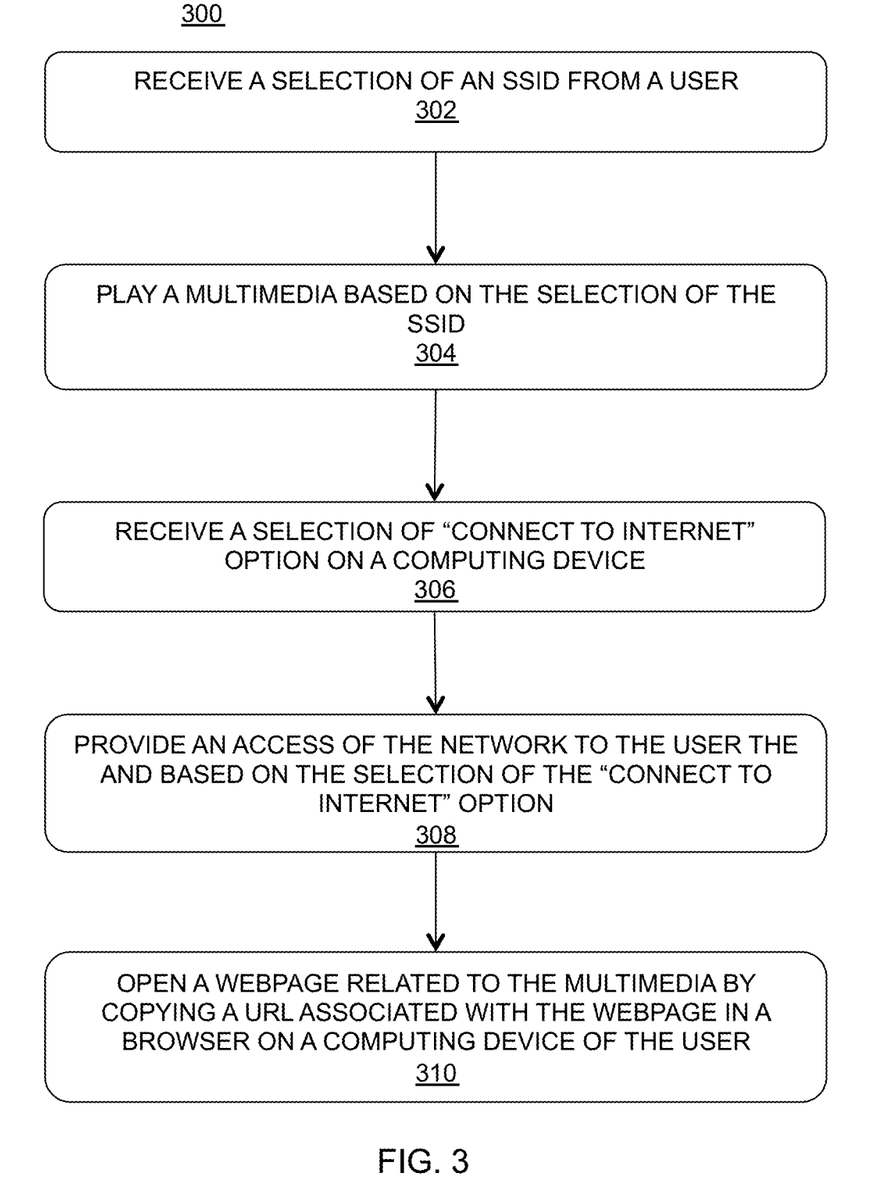
FIG. 3 is a flowchart illustrating an exemplary method for providing an access of a network to a user, in accordance with an embodiment of the present disclosure.

FIG. 3 is a flowchart illustrating an exemplary method for providing an access of a network to a user, in accordance with an embodiment of the present disclosure. As discussed with reference to FIG. 1, the user 102 may access the computing device 104 for connecting to the network 106. Further, as shown in the FIG. 2, the freedom portal 202 may manage an access to the network 106. The freedom portal 202 may include the transceiver 204, the display-managing device 206, the connection-managing device 208, and the storage device 210.

At step 302, the freedom portal 202 receives a selection of an SSID from the computing device 104 of the user 102. In some embodiments, the transceiver 204 receives the selection of the SSID. The SSID may be identifier or name of the network 106. The network 106 may be a wireless network comprising the Internet.

At step 304, the freedom portal 202 plays or presents a multimedia according to the selected SSID on the computing device 104. The multimedia can be an advertisement of a product or service. In some embodiments, the display-managing device 206 presents the multimedia onto the computing device 104. The user 102 is also presented with a forward/rewind option or a play option for forwarding or rewinding or playing/pausing/terminating the multimedia. The display-managing device 206 may also present a "Connect to Internet" option to the user 102 on the computing device 104. The user 102 may select the "Connect to Internet" option on the computing device 104. Then at step 306, the transceiver 204 receives the selection of the "Connect to Internet" option from the computing device 104. Then at step 308, the transceiver 204 provides an access of the network 106 to the user 102 based on the selection of the "Connect to Internet" option by the user 102. In some embodiments, the user 102 is given the access of the network 106 when the user 102 terminates the multimedia. In some embodiments, the display-managing device 206 displays one or more URLs related to the multimedia on the computing device 104. For example, the multimedia may be an advertisement of a product like bag, watch, etc., and the URLs may be link to open website(s) for shopping the product. In some embodiments, the connection-managing device 208 provides the access of the network 106 to the user 102 by connecting the computing device 104 to the network 106 such as the Internet.

Thereafter, at step 310, the connection-managing device 208 opens a webpage related to the multimedia by automatically copying and pasting a URL associated with the webpage in a browser on the computing device 104. The user 102 may explore the webpage but it is not mandatory for the user 102 to explore the webpage for connecting to the Internet. In some embodiments, the user 102 may be presented with the URL or one or more URLs in multiple white boxes. Further, the display-managing device 206 may open the webpage based on the selection of the URL by the user 102.

Figure 4A:
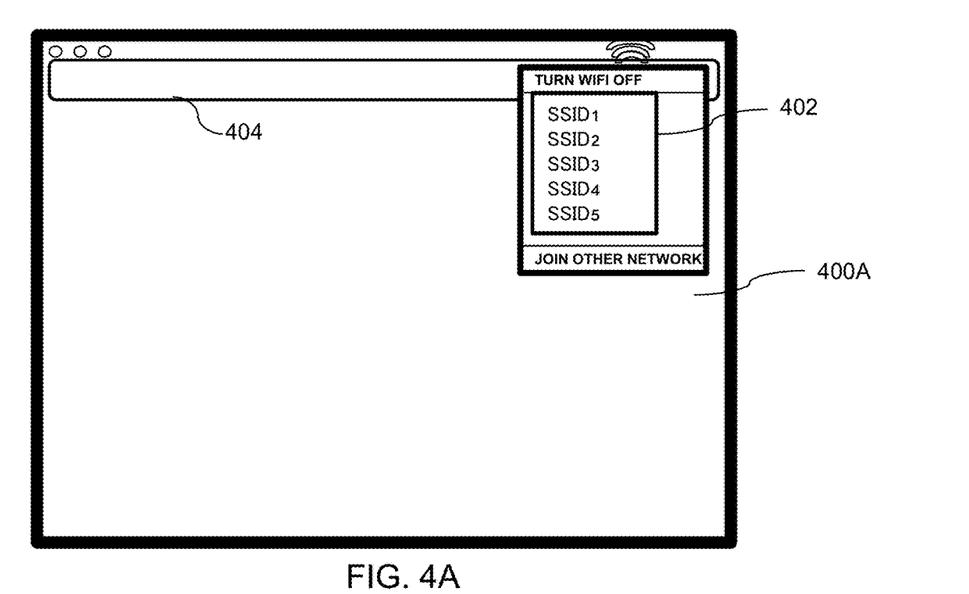
FIGS. 4A-4C depicts various interfaces on the computing device for providing an access of a network to a user, in accordance with an embodiment of the present disclosure.
Figure 4B:
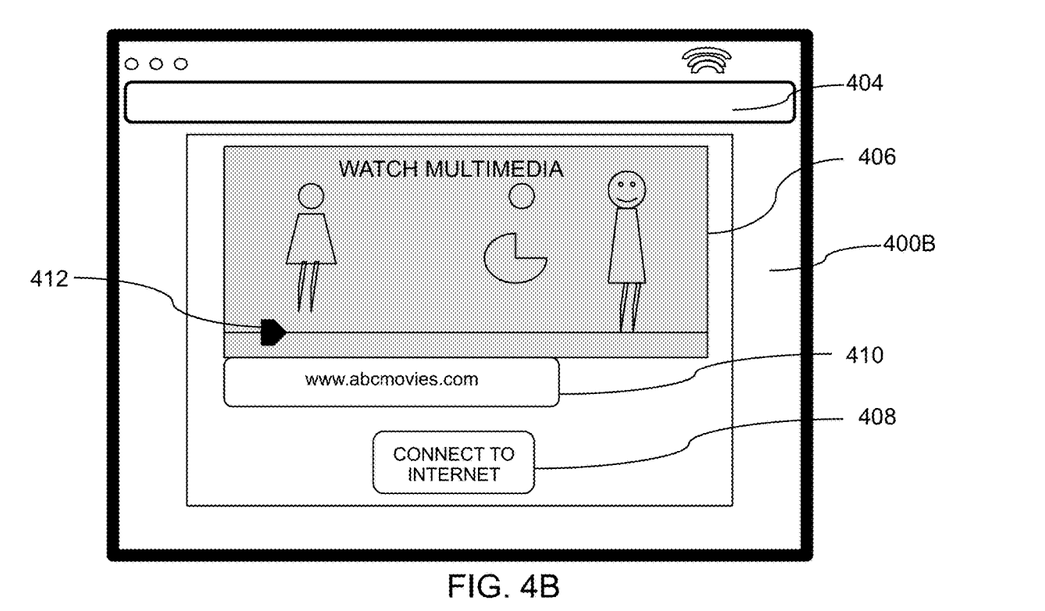
Figure 4C:
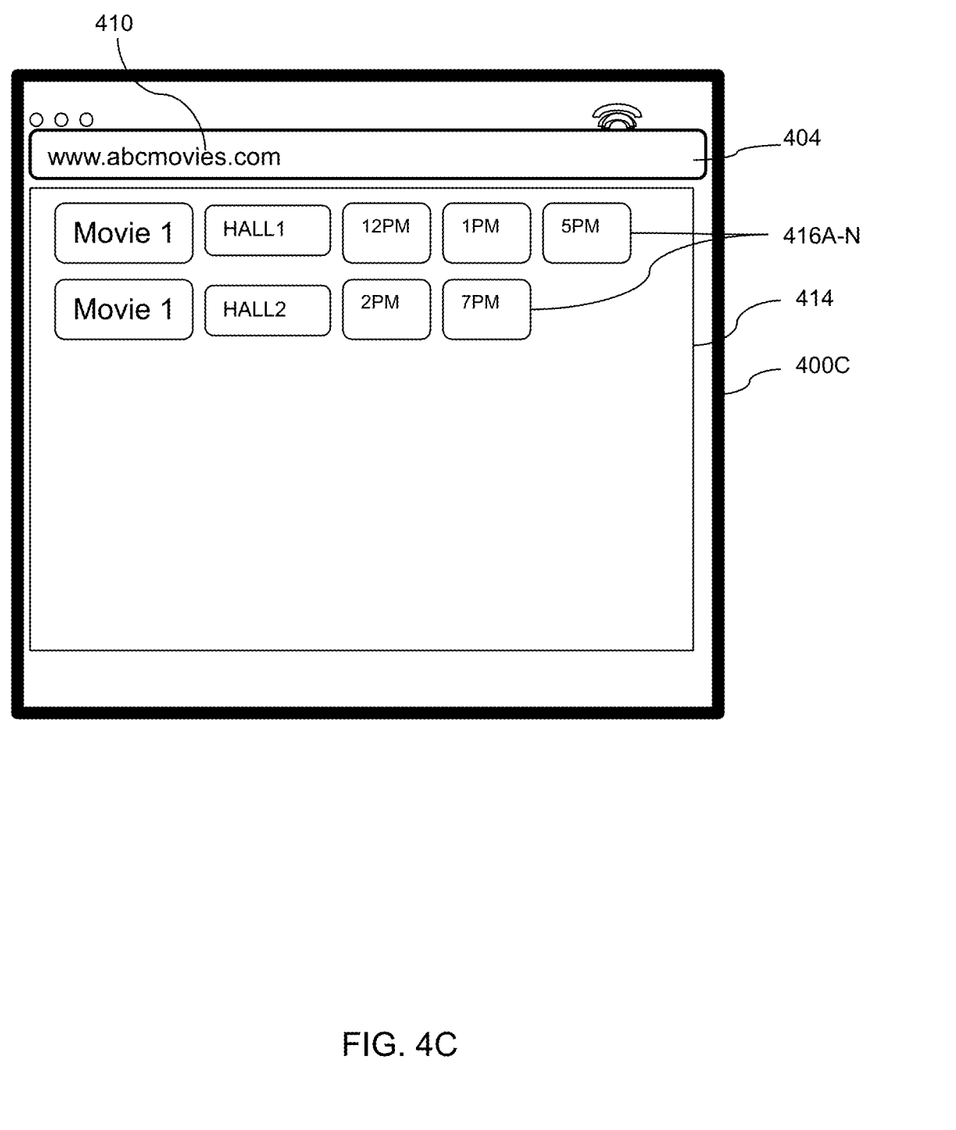

FIGS. 4A-4C shows various interfaces 400A, 400B, and 400C for providing an access of a network to a user on a computing device, in accordance with an embodiment of the present disclosure. As discussed with reference to FIG. 1, the interfaces 4A-4C may be graphical user interfaces on the computing device 104 via which the user 102 may interact with the computing device 104 and connect to the network 106 to explore the Internet.

As shown in FIG. 4A, the user 102 may view a list 402 of a plurality of SSIDs associated with a plurality of networks on the interface 400A on computing device 104. Each of the plurality of SSIDs of the list 402 may be a unique identifier associated with the plurality of networks. The user 102 may select at least one SSID for connecting to at least one network (such as the network 106) of the plurality of networks. The SSID may be an alphanumeric identifier or a name of the at least one network 106. As discussed with reference to FIG. 2, the freedom portal 202 may receive the selection of the at least one SSID from the computing device 104. In some embodiments, the transceiver 204 receives the selection of the at least one SSID from the computing device 104. The interface 400A also includes a browser or a browsing application 404. The browser 404 enables the user 102 to paste a uniform resource locator for exploring a web site.

Turning now to FIG. 4B the interface 400B is shown. The freedom portal 202 may search for a matching multimedia 406 related to the selected SSID. The freedom portal 202 presents the matching multimedia 406 along with a "Connect to Internet" option 408 to the user 102 via the interface 400B on the computing device 104. The user 102 may also control such as forward, rewind, play, or pause the multimedia by moving a play option 412 on the interface 400B. The user 102 needs not to watch the multimedia; the user 102 can switch to connect to the Internet option for connecting to the Internet without any delay. The freedom portal 202 via the interface 400B also presents a URL 410 linked to a website or a webpage related to the multimedia to the user 102. In some embodiments, the display-managing device 206 presents multimedia 406, the "Connect to Internet" option 408, the URL 410, and the play option 412 on the interface 400B. The user 102 can select the "Connect to Internet" option 408 after the completion of the multimedia 406. The connection-managing device 208 connects the computing device 104 to the Internet. In some embodiments, the freedom portal 202 automatically copies the URL 410 and pastes in the browser 404 for opening the website related to the multimedia 406 on the computing device 104. In alternate embodiments, the user 102 copies the URL 410 and pastes the URL 410 in the browser 404.

FIG. 4C depicts the interface 400C. The freedom portal 202 or the display-managing device 206 opens a website or webpage 414 associated with the URL 410 via the interface 400C on the computing device 104. For example, the multimedia 406 may be an audio/video clip of a movie 1 promotion, and the URL 410 may be a link for webpage for booking the movie tickets for the movie 1. The webpage 414 may include multiple booking options 416A-N for booking the movie 1. The user 102 may either proceed with the booking of the movie 1 by selecting at least one of the booking options 416A-N or may explore the Internet as per his/her preference. The user 102 may be free to explore the Internet and may not be mandatory for the user 102 to book the tickets or explore the URL 410. Hence, the freedom portal 202 provides freedom to the user 102 to connect to the Internet without surrendering his/her personal information.

The present disclosure enables a user to connect to the Internet or a network without disclosing or surrendering any personal information.

The present disclosure may also enable a user to explore web sites related to the SSID of the network. In some embodiments, the SSID may be in accordance with the network.

The present disclosure may aware the user about a product/service/entertainment service and generate an interest of the user in the same. The user is free to decide whether the user wants to proceed to view more details about the product/service/entertainment service advertised via a multimedia by selecting one or more URLs displayed on the computing device.

The present disclosure may also enable the user to select an SSID of a preferred network and a preferred URL from a list of a plurality of URLs related to the preferred network. The user is given freedom to select the SSID and URL of his/her own choice.

It will be understood that the devices and the databases referred to in the previous sections are not necessarily utilized together method or system of the embodiments. Rather, these devices are merely exemplary of the various devices that may be implemented within a computing device or the server device, and can be implemented in exemplary another devices, and other devices as appropriate, that can communicate via a network to the exemplary server device.

It will be appreciated that several of the above-disclosed and other features and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

The above description does not provide specific details of manufacture or design of the various components. Those of skill in the art are familiar with such details, and unless departures from those techniques are set out, techniques, known, related art or later developed designs and materials should be employed. Those in the art are capable of choosing suitable manufacturing and design details.

The terminology used herein is for the purpose of describing particular embodiments only and is not intended to be limiting of the disclosure. It will be appreciated that several of the above-disclosed and other features and functions, or alternatives thereof, may be combined into other systems, methods, or applications. Various presently unforeseen or unanticipated alternatives, modifications, variations, or improvements therein may subsequently be made by those skilled in the art without departing from the scope of the present disclosure as encompassed by the following claims.

What is claimed is:

1. A method for providing an access of a network to a user, comprising:
   receiving a selection of at least one Service Set Identifier (SSID) associated with the network from the user, wherein the user selects the at least one SSID from a plurality of SSIDs on an associated computing device;
   presenting an embedded multimedia along with a connect option on the computing device of the user based on the selection of the at least one SSID;
   connecting the computing device to the network based on a selection of the connect option; and
   opening at least one webpage associated with at least one uniform resource locator (URL) related to the multimedia on the computing device.

2. The method of claim 1 further comprising providing a forward option for forwarding the multimedia and a rewind option for rewinding the multimedia to the user.

3. The method of claim 1 further comprising:
   presenting the one or more URLs related with the embedded multimedia to the user; and
   opening the at least one webpage associated with the at least one URL of the one or more URLs based on a selection of the at least one URL by the user.

4. The method of claim 1 further comprising:
   automatically copying a URL related to the embedded multimedia to a clipboard of the computing device;
   automatically pasting the URL in an address bar of a browser on the computing device; and
   opening a webpage associated with the URL on the computing device.

5. The method of claim 4, wherein the user pastes the URL in the address bar of the browser on the computing device.

6. The method of claim 1, wherein the embedded multimedia comprising at least one advertisement associated with the selected at least one SSID.

7. The method of claim 1, wherein the plurality of SSIDs are associated with a plurality of networks.

8. A system for providing an access of a network to a user, comprising:
   a transceiver for receiving a selection of at least one Service Set Identifier (SSID) associated with a network from the user, wherein the user selects the at least one SSID from a plurality of SSIDs on an associated computing device;
   a display-managing device for presenting an embedded multimedia along with a connect option on the computing device of the user based on the selection of the at least one SSID; and
   a connection-managing device for connecting the computing device to the network based on a selection of the connect option;
   wherein the display-managing device opens at least one webpage associated with at least one uniform resource locator (URL) related to the multimedia on the computing device.

9. The system of claim 8, wherein the display-managing device if further configured to:
   present the one or more URLs related with the embedded multimedia to the user; and
   open the at least one webpage associated with the at least one URL of the one or more URLs based on a selection of the at least one URL by the user.

10. The system of claim 8, wherein the display-managing device is further configured to:
    automatically copy a URL related to the embedded multimedia to a clipboard of the computing device;
    automatically paste the URL in an address bar of a browser on the computing device; and
    open a webpage associated with the URL on the computing device.

11. The system of claim 10, wherein the user pastes the URL in the address bar of the browser on the computing device.

12. The system of claim 8, wherein the display-managing device is further configured to provide a forward option for forwarding the multimedia and a rewind option for rewinding the multimedia to the user.

13. The system of claim 8, wherein the embedded multimedia comprising at least one advertisement associated with the selected at least one SSID.

14. The system of claim 8, wherein the plurality of SSIDs are associated with the plurality of networks.

15. A freedom portal for managing an access to a network, comprising:
    a transceiver configured to receive a selection of at least one Service Set Identifier (SSID) associated with the network from a user, wherein the user selects the at least one SSID from a plurality of SSIDs on an associated computing device;
    a display-managing device configured to:
       presenting an embedded multimedia along with a "Connect to Internet" option on the computing device of the user based on the selection of the at least one SSID, wherein the user controls playing of the embedded multimedia by selecting a play option;
       presenting the one or more URLs related to the embedded multimedia to the user; and
       opening at least one webpage associated with at least one URL based on a selection of the at least one URL of the one or more URLs by the user;
    a connection-managing device for connecting the computing device to the network based on a selection of the "Connect to Internet" option received from the user.

16. The freedom portal of claim 15, wherein the display-managing device is further configured to provide a play option for at least one of playing, pausing, forwarding and rewinding the multimedia on the computing device.

17. The freedom portal of claim 15, wherein the display-managing device is further configured to:
- automatically copy a URL related to the embedded multimedia to a clipboard of the computing device;
- automatically paste the URL in an address bar of a browser on the computing device; and
- open a webpage associated with the URL on the computing device.

18. The freedom portal of claim 17, wherein the user pastes the URL in the address bar of the browser on the computing device.

19. The freedom portal of claim 15, wherein the embedded multimedia comprising at least one advertisement associated with the selected at least one SSID.

20. The freedom portal of claim 15, wherein the plurality of SSIDs are associated with the plurality of networks.

* * * * *